(12) United States Patent
Raindel et al.

(10) Patent No.: US 9,894,005 B2
(45) Date of Patent: Feb. 13, 2018

(54) ADAPTIVE ROUTING CONTROLLED BY SOURCE NODE

(71) Applicant: Mellanox Technologies Ltd., Yokneam (IL)

(72) Inventors: Shachar Raindel, Haifa (IL); Idan Burstein, Karmiel (IL); Noam Bloch, Bat Shlomo (IL); Benny Koren, Zichron Yaakov (IL); Barak Gafni, Kfar Malal (IL); Dror Goldenberg, Zichron Yaakov (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 327 days.

(21) Appl. No.: 14/673,892

(22) Filed: Mar. 31, 2015

(65) Prior Publication Data
US 2016/0294715 A1  Oct. 6, 2016

(51) Int. Cl.
*H04L 12/28* (2006.01)
*H04L 12/801* (2013.01)
*H04L 12/707* (2013.01)
*H04L 12/721* (2013.01)
*H04L 12/803* (2013.01)

(52) U.S. Cl.
CPC .............. *H04L 47/34* (2013.01); *H04L 45/22* (2013.01); *H04L 45/38* (2013.01); *H04L 47/122* (2013.01)

(58) Field of Classification Search
CPC ......... H04L 45/22; H04L 45/38; H04L 47/34; H04L 47/122
See application file for complete search history.

(56) References Cited

U.S. PATENT DOCUMENTS

| 4,312,064 A | 1/1982 | Bench et al. |
| 6,115,385 A | 9/2000 | Vig |
| 6,169,741 B1 | 1/2001 | LeMaire et al. |
| 6,480,500 B1 | 11/2002 | Erimli et al. |

(Continued)

FOREIGN PATENT DOCUMENTS

WO   2016105446 A1   6/2016

OTHER PUBLICATIONS

Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.

(Continued)

*Primary Examiner* — Charles C Jiang
*Assistant Examiner* — Ryan Kavleski
(74) *Attorney, Agent, or Firm* — D. Kligler IP Services Ltd.

(57) ABSTRACT

A method in a network element that includes multiple interfaces for connecting to a communication network includes receiving from the communication network via an ingress interface a flow including a sequence of packets, and routing the packets to a destination of the flow via a first egress interface. A permission indication for re-routing the flow is received in the ingress interface. In response to receiving the permission indication, subsequent packets of the flow are re-routed via a second egress interface that is different from the first egress interface. Further re-routing of the flow is refrained from, until receiving another permission indication.

30 Claims, 3 Drawing Sheets

(56) References Cited

U.S. PATENT DOCUMENTS

| | | |
|---|---|---|
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |
| 6,804,532 B1 | 10/2004 | Moon et al. |
| 6,831,918 B1 | 12/2004 | Kavak |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,234,001 B2 | 6/2007 | Simpson et al. |
| 7,286,535 B2 | 10/2007 | Ishikawa et al. |
| 7,676,597 B2 | 3/2010 | Kagan et al. |
| 7,746,854 B2 | 6/2010 | Ambe et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,755,389 B1 | 6/2014 | Poutievski et al. |
| 8,774,063 B2 | 7/2014 | Beecroft |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,571,400 B1 | 2/2017 | Mandal et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2003/0016624 A1* | 1/2003 | Bare ............... H04L 29/12009 370/217 |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0223453 A1 | 12/2003 | Staler et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0291480 A1 | 12/2006 | Cho et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1* | 10/2008 | Farinacci ............ H04L 12/1877 370/244 |
| 2008/0298248 A1 | 12/2008 | Roeck et al. |
| 2009/0103534 A1 | 4/2009 | Malledant et al. |
| 2009/0119565 A1 | 5/2009 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1* | 8/2010 | Mariniello ........... H04Q 3/0041 455/417 |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez Gutierrez |
| 2011/0075592 A1* | 3/2011 | Beecroft ............... H04L 1/1607 370/276 |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0096668 A1* | 4/2011 | Bloch ................. H04L 45/38 370/237 |
| 2011/0164496 A1 | 7/2011 | Loh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1* | 3/2012 | Ko ................... H04L 43/0858 370/238 |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1* | 6/2012 | Wang .................. H04L 45/22 398/2 |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0170451 A1 | 7/2013 | Krause et al. |
| 2013/0208720 A1 | 8/2013 | Ellis et al. |
| 2013/0242745 A1 | 9/2013 | Umezuki |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0336116 A1 | 12/2013 | Vasseur et al. |
| 2014/0043959 A1 | 2/2014 | Owens et al. |
| 2014/0140341 A1 | 5/2014 | Bataineh et al. |
| 2014/0192646 A1 | 7/2014 | Mir et al. |
| 2014/0198636 A1 | 7/2014 | Thayalan et al. |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0098466 A1 | 4/2015 | Haramaty et al. |
| 2015/0124815 A1 | 5/2015 | Beliveau et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2016/0014636 A1 | 1/2016 | Bahr et al. |
| 2016/0080120 A1 | 3/2016 | Unger et al. |
| 2016/0080321 A1 | 3/2016 | Pan et al. |
| 2016/0182378 A1 | 6/2016 | Basavaraja et al. |

OTHER PUBLICATIONS

U.S. Appl. No. 14/732,853 Office Action dated Jan. 26, 2017.
U.S. Appl. No. 14/046,976 Office Action dated Jan. 14, 2016.
U.S. Appl. No. 14/662,259 Office Action dated Sep. 22, 2016.
Afek et al., "Sampling and Large Flow Detection in SDN", SIGCOMM '15, pp. 345-346, Aug. 17-21, 2015, London, UK.
Leiserson, C E., "Fat-Trees: Universal Networks for Hardware Efficient Supercomputing", IEEE Transactions on Computers, vol. C-34, No. 10, pp. 892-901, Oct. 1985.

(56) References Cited

OTHER PUBLICATIONS

Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBand™ Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03), Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International Conference on Wireless, Mobile and Multimedia Networks, pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
Haramaty et al., U.S. Appl. No. 14/745,488, filed Jun. 22, 2015.
Haramaty et al., U.S. Appl. No. 14/732,853, filed Jun. 8, 2015.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Nkposong et al., "Experiences with BGP in Large Scale Data Centers:Teaching an old protocol new tricks", 44 pages, Jan. 31, 3014.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
Nowlab—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Glass et al., "The turn model for adaptive routing", Journal of the ACM, vol. 41, No. 5, pp. 874-903, Sep. 1994.
U.S. Appl. No. 14/745,488 Office Action dated Dec. 6, 2016.
U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
U.S. Appl. No. 14/970,608 Office Action dated May 30, 2017.
U.S. Appl. No. 14/970,608 office action dated Nov. 1, 2017.
U.S. Appl. No. 15/152,077 office action dated Dec. 1, 2017.

\* cited by examiner

ADAPTIVE ROUTING CONTROLLED BY SOURCE NODE

FIELD OF THE INVENTION

The present invention relates generally to communication systems, and particularly to methods and systems for adaptive routing.

BACKGROUND OF THE INVENTION

Various techniques for routing packets through communication networks are known in the art. Some known techniques select routing paths for packets based on the network state, e.g., traffic load or congestion. Such techniques are sometimes referred to as Adaptive Routing (AR). For example, U.S. Pat. No. 6,950,428, whose disclosure is incorporated herein by reference, describes adaptive sets of lanes that are configured between routers in a system area network. Source nodes determine whether packets may be adaptively routed between the lanes by encoding adaptive control bits in the packet header. The adaptive control bits also facilitate the flushing of all lanes of the adaptive set. Adaptive sets may also be used in uplinks between levels of a fat tree.

As another example, U.S. Pat. No. 8,576,715, whose disclosure is incorporated herein by reference, describes a method for communication that includes routing a first packet, which belongs to a given packet flow, over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

Adaptive routing may cause packets sent by a source to arrive at the destination in an order different from the transmission order. Techniques for preserving packet ordering are known in the art. For example, U.S. Pat. No. 8,774,063, whose disclosure is incorporated herein by reference, describes a method of preserving packet ordering in a multi-path network having a plurality of network elements interconnected by network links wherein for each data packet arriving at an egress port of the multi-path network, a delivery acknowledgement is issued by the egress port and is transmitted across the network following in reverse the path taken by the data packet being acknowledged, and wherein the state of each link in the path taken by the data packet being acknowledged is updated by the acknowledgement.

SUMMARY OF THE INVENTION

An embodiment that is described herein provides a method in a network element that includes multiple interfaces for connecting to a communication network, including receiving from the communication network via an ingress interface a flow including a sequence of packets, and routing the packets to a destination of the flow via a first egress interface. A permission indication for re-routing the flow is received in the ingress interface. In response to receiving the permission indication, subsequent packets of the flow are re-routed via a second egress interface that is different from the first egress interface. Further re-routing of the flow is refrained from, until receiving another permission indication.

In some embodiments, the method includes sending a request to a source node from which the flow originates to send the permission indication. In other embodiments, sending the request includes sending one or more request messages in response to detecting congestion on the first egress interface. In other embodiments, re-routing the subsequent packets includes selecting the second egress interface using an adaptive routing method.

There is additionally provided, in accordance with an embodiment that is described herein, a method in a source node that communicates with a destination node via a communication network that includes network elements. The method includes sending a flow including a sequence of packets to the destination node through a path including one or more of the network elements. A time point suitable for re-routing the flow to a different path is selected by the source node. After selecting the time point, a permission for re-routing subsequent packets of the flow is indicated by the source node to one or more of the network elements.

In some embodiments, indicating the permission includes permitting a single re-routing of the flow. In other embodiments, selecting the time point includes selecting a time in which re-routing the flow is not expected to cause out-of-order delivery of the packets. In yet other embodiments, selecting the time point includes suspending the flow in the source node until all the packets sent by the source node prior to suspending the flow are acknowledged by the destination node.

In an embodiment, the packets belong to at least one of a first and second types, and packets of the first type should be delivered in order, and packets of the second type are allowed to be delivered out of order, and selecting the time point applies to the packets of the first type and not to the packets of the second type. In another embodiment, the flow includes a dynamically connected (DC) flow, and selecting the time point includes choosing the time point after disconnecting the flow with the destination node and before re-connecting the flow with another destination node. In yet another embodiment, electing the time point includes choosing the time point in response to receiving a re-routing permission request from a network element.

In some embodiments, selecting the time point includes blocking pending transport level transactions until all outstanding transactions are completed. In other embodiments, sending the flow includes transmitting the flow using a transport layer protocol, and selecting the time point includes analyzing a status of the transport layer protocol. In yet other embodiments, indicating the permission includes setting a permission value in a field of a packet header.

In an embodiment, the permission value includes a routing value that determines per-packet routing within the network elements, and indicating the permission includes changing the routing value. In another embodiment, indicating the permission includes sending a dedicated permission packet. In yet another embodiment, selecting the time point includes choosing the time point randomly.

In some embodiments, selecting the time point includes applying to the flow a transport-level function that creates the time point suitable for re-routing the flow. In other embodiments, applying the transport-level function includes applying the function at a random time. In yet other embodiments, applying the function at a random time includes selecting the random time depending on at least a congestion control state of the flow.

There is additionally provided, in accordance with an embodiment that is described herein, a network element including packet processing circuitry and multiple interfaces. The interfaces are configured to connect the to a communication network. The packet processing circuitry is configured to receive from the communication network via an ingress interface a flow including a sequence of packets, and to route the packets to a destination of the flow through a first egress interface, to receive via the ingress interface, a permission indication for re-routing the flow, and in response to receiving the permission indication, to re-route subsequent packets in the flow through a second egress interface that is different from the first egress interface, and to refrain from further re-routing of the flow until receiving another permission indication.

There is additionally provided, in accordance with an embodiment that is described herein, a network node including a network interface and circuitry. The network interface is configured to communicate with a destination node via a communication network that includes network elements. The circuitry is configured to send a flow including a sequence of packets to the destination node through a path including one or more of the network elements, to select a time point suitable for re-routing the flow to a different path, and, after selecting the time point, to indicate to one or more of the network elements a permission for re-routing subsequent packets of the flow.

The present invention will be more fully understood from the following detailed description of the embodiments thereof, taken together with the drawings in which:

DETAILED DESCRIPTION OF EMBODIMENTS

Overview

Embodiments of the present invention that are described herein provide methods and systems for Adaptive Routing (AR) of packets under the control of the source node sending the packets. In some disclosed embodiments, a packet network comprises multiple network elements such as switches and/or routers that deliver packets through the network. In some cases, flows comprising sequences of packets can be delivered end-to-end over the network via multiple possible routing paths of the network elements. In the description that follows, the source node is also referred to as a flow originator.

Changing the routing paths over time can be advantageous, for example, to resolve congestion situations in the network. Changing the path during the lifetime of the flow, however, may result in out-of-order arrival of the flow packets at the destination, which in turn increases the traffic load, e.g., because of packet retransmissions.

In some disclosed techniques, the flow originator chooses when to permit the network elements to re-route the flow, so as to prevent or significantly reduce the possibility of out-of-order packet delivery. In other words, the flow originator chooses a suitable point in time in which re-routing of a given flow is permitted. The flow originator may choose the point in time, for example, based on information related to transport layer protocols that is unavailable to the network elements, and can therefore make better routing decisions than the network elements are able to make alone.

Having chosen the appropriate point in time, the source node typically sends to the network elements a permission indication for re-routing the given flow. A network element that receives such permission is allowed to select a different egress interface for the flow once, and is expected not to apply further re-routing until receiving another permission indication. The network element may select the different egress interface, for example, using a suitable AR method.

In one embodiment, the source node suspends the flow to be re-routed, and sends the permission indication only after all (or a sufficiently large part of) the flow packets are acknowledged by the destination node. Since the network elements re-route the flow when there are no packets in flight, re-routing will not cause out-of-order delivery.

In an embodiment, a network element detects that a given flow is congested, and sends to the source node a message requesting the source node to send a respective permission for re-routing. The network element re-routes the flow only when receiving the respective permission indication.

In other embodiments, the source node detects that a flow is congested independently of the network elements, for example by analyzing certain transport layer parameters of the flow, such as the number of outstanding work requests, timeout events and retransmission events. To prevent out-of-order packet delivery, the source node can send the permission indication when there are no packets of the flow in flight as described above.

The source node can indicate the permission for re-routing using any suitable method, such as by sending a dedicated packet or using available fields in the headers of the flow packets. In some embodiments the permission indication comprises an absolute value, such as, for example, a binary value. In alternative embodiments, the permission indication comprises a value change, such as a change in a header field serving as flow identifier.

In the disclosed techniques, the source node communicates signaling information with the network elements to control adaptive routing. Such signaling between transport layer functions at the source node and network or link layer functions in the network elements provides mechanisms for adaptive routing that are not possible to implement using the network elements alone. The disclosed techniques prevent unnecessary packet retransmissions due to out-of-order packet delivery, and improve the traffic flow and network performance.

System Description

Figure 1:
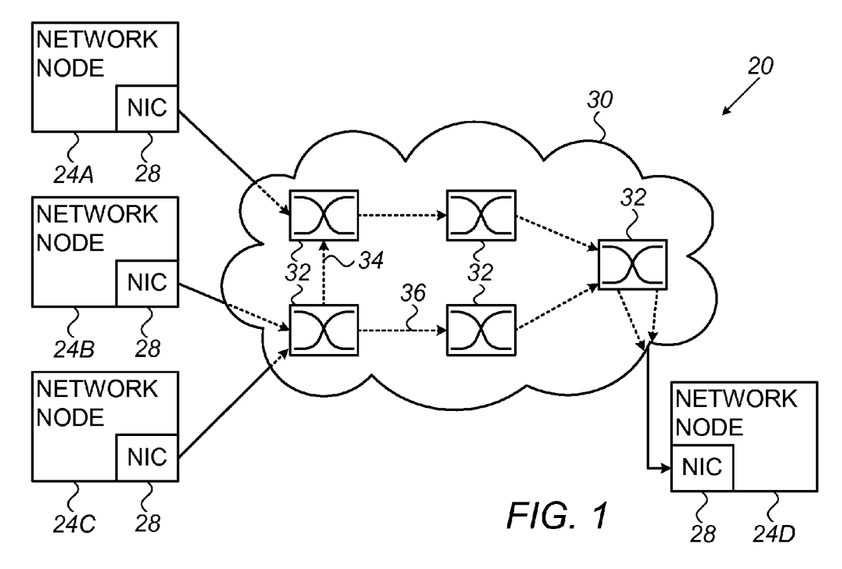
FIG. 1 is a block diagram that schematically illustrates a computer system, in accordance with an embodiment that is described herein.

FIG. 1 is block diagram that schematically illustrates a computer system 20, in accordance with an embodiment that is described herein. System 20 comprises multiple host computers 24 which communicate with one another over a network 30 and thus function as network nodes of the network. Network nodes 24 connect to network via respective Network Interface Controllers (NICs) 28.

Network 30 may comprise any suitable communication network such as, for example, an InfiniBand (IB) switch fabric, or packet networks of other sorts, such as Ethernet or Internet Protocol (IP) networks, that are configured for transport-layer transaction support. Alternatively, network 30 may operate in accordance with any other suitable standard or protocol.

Network 30 typically comprises multiple network elements 32, which are interconnected. Network elements 32 may comprise, for example, switches, routers, bridges, gateways, or any other suitable type of network elements. Network 30 may comprise multiple subnets, wherein at least some of network nodes 24 may be located in different subnets, which may be connected by different routing paths.

In various networks, packets sent from a source node to a destination node can be delivered via two or more different routing paths. Adaptive routing techniques may be used in choosing the optimal routing path and changing the path as required. For example, network node 24C serving as a source node may initially transmit packets to destination node 24D via a path 34. Subsequently, network elements 32 may choose a different path from source node 24C to destination node 24D, such as a path 36, possibly due to occurrence of congestion on path 34. As a result of this routing change, at least some of the packets sent by the source node may arrive at the destination node out of order. Thus, one or more packets conveyed over path 36 may reach destination node 24D before another packet or packets that were transmitted previously over path 34. Other network nodes such as 24A, 24B, and 24C may encounter similar problems in packet streams that they receive.

As will be described in detail below, in the disclosed embodiments, the source node chooses a point in time that is safe for re-routing a flow in the sense that the re-routing is unlikely to cause the flow packets to arrive out of order at the destination, and indicates permission for re-routing the flow to one or more of the network elements.

Figure 2:
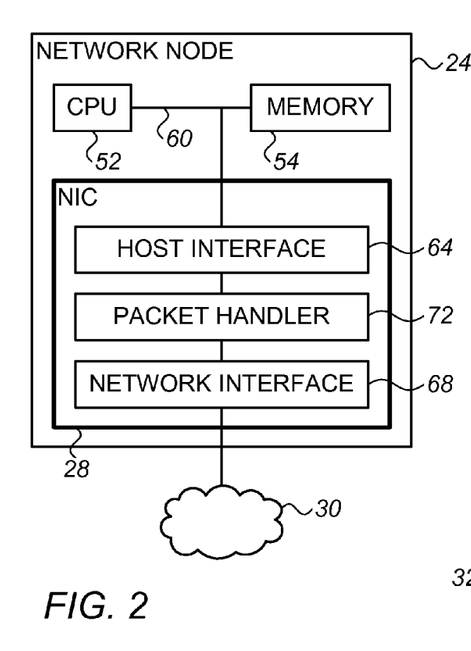
FIG. 2 is a block diagram that schematically illustrates a network node, in accordance with an embodiment that is described herein.

FIG. 2 is a block diagram that schematically illustrates network node 24, in accordance with an embodiment that is described herein. Network node 24 comprises a central processing unit (CPU) 52 and a host memory 54, which are connected to a bus 60, such as a PCI Express® bus. The network node is connected to network 30 by NIC 28, such as a Host Channel Adapter (HCA).

NIC 28 is coupled to bus 60 by a host interface 64. In some embodiments, host interface 64 is capable of reading data from and writing data to memory 54 by direct memory access (DMA), as well as receiving certain instructions from and issuing interrupts to CPU 52. Such direct memory access capabilities are used, for example, by the Remote Direct Memory Access (RDMA) transport layer protocol. A network interface 68 in NIC 28 comprises one or more ports (not shown in the figure) for transmitting packets to and receiving packets from network 30.

A packet handler 72 is coupled between host interface 64 and network interface 68. The packet handler processes packets incoming from the network via network interface 68, and packets to be sent from host interface 64 to the network.

In some embodiments, network nodes 24 communicate with one another using layered communication protocols including a transport layer protocol. Transport layer protocols provide host-to-host services such as connection-oriented data stream support, reliability, flow control, and multiplexing. Example transport layer protocols include the transmission control protocol (TCP), the user datagram protocol (UDP), and the RDMA protocol. In some embodiments, NIC 28 implements the transport layer protocol internally, e.g., within packet handler 72, thus offloading this task from the network node.

As noted above, re-routing a flow may result in out-of-order packet delivery. In some embodiments, the source node chooses a safe point in time in which re-routing the packets is unlikely to cause packets that should be delivered in order to arrive at the destination out of order. For example, the safe point may refer to a time instance at which the flow has no in-flight packets within the network, i.e., all the flow packets sent by the source node were acknowledged by the destination node. Methods for selecting a time point that is suitable for re-routing are described in detail below.

In some embodiments, some flows tolerate arbitrary amount of reordering, and therefore, for such flows, the source node may mark all the flow packets as indicating re-routing permission. This scheme is useful, for example, in cases in which the source and destination nodes do not handle congestion by dropping packets, and the destination node supports packet reordering in an almost infinite manner.

In response to selecting a time point suitable for re-routing, the source node sends to the network elements a permission indication for re-routing the flow. A network element that receives such permission may re-route subsequent packets of the flow to a different egress interface, but should avoid re-routing the flow packets again until receiving another permission indication.

The functionality in the network node that is related to controlling the adaptive routing can be partitioned among the different elements of network node is various ways, such as implementing this functionality in packet handler 72 of the NIC, CPU 52 or divided between packet handler 72 and CPU 52.

In the context of the present disclosure and in the claims, the elements of network node 24 excluding network interface 68 of the NIC are collectively referred to as circuitry. Thus, referring to the circuitry as performing some function means that the function is executed by any element or elements of the node, such as CPU 52, packet handler 72 and/or any other element of the node, excluding network interface 68.

Figure 3:
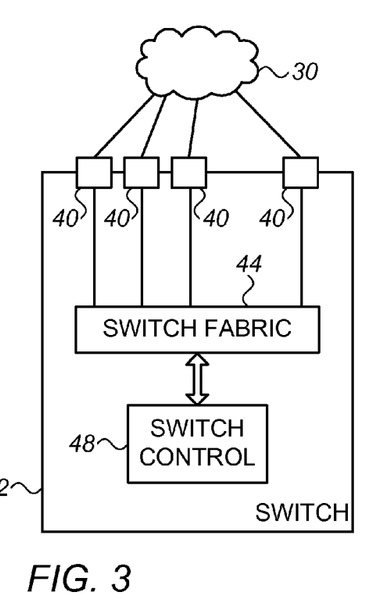
FIG. 3 is a block diagram that schematically illustrates a network switch, in accordance with an embodiment that is described herein.

FIG. 3 is a block diagram that schematically illustrates network switch 32, in accordance with an embodiment that is described herein. Although the description that follows refers mainly to a network switch, the disclosed techniques can be used with various other types of network elements.

Switch 32 comprises multiple ports 40 for exchanging data packets with network 30. In some embodiments a given port 40 can function as an ingress interface for incoming packets or as an egress interface for outputting packets. Alternatively, a port 40 can function as both ingress and egress interfaces.

Switch 32 comprises a configurable switch fabric 44, which forwards packets between ports 40 in accordance with a certain routing plan. Typically, each packet belongs to a certain flow. By routing a certain flow to a certain port, fabric 44 causes the packets of that flow to be routed over a certain routing path through network 30. Thus, each flow is typically assigned a certain routing path at any given time, and all the packets of the flow are routed by fabric 44 over that routing path. Switch 32 typically routes multiple flows simultaneously.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

The term "flow" refers to a sequence of packets, which transfer application data between a pair of end nodes. In some cases, although not necessarily, the packets in a given flow are required to arrive in the same order they were sent.

Switch 32 comprises a switch control unit 48, which configures fabric 44 to apply the desired routing plan. In the present context, fabric 44 and control unit 48 are referred to collectively as packet processing circuitry, which perform the various packet processing functions of switch 32. By controlling the routing plan, switch 32 is able to cause the packets to traverse various routing paths through network 30. In some embodiments, control unit 48 re-routes a given flow only in response to explicit permission indication sent by the flow originator, as will be described below. Control unit 48 may initiate a request to the flow originator to allow such permission, for example, upon detecting that the flow is congested.

To re-route a given flow, control unit 48 selects for the flow packets, which the switch receives via an ingress interface, a different egress interface. Switch may, for example, save the current associations between ingress and egress interfaces in a Forwarding Database (FDB) (not shown in the figure). Alternatively, switch 32 can hold a set of routing rules, e.g., per flow.

Forwarding the packets is typically based on certain fields in the packet headers. The fields may include, for example, at least one of the source and destination addresses, the underlying protocol and the source and destination port numbers. In some embodiments, forwarding the packets comprises calculating a hash function over one or more fields in the packet headers, and using the result hash value for selecting a respective egress interface for the packet.

When receiving a permission indication for re-routing at the switch, control unit 48 may select the egress interface using any suitable method such as using adaptive routing techniques.

In some embodiments, the flow comprises packets of a first type that should be delivered in order, as well as packets of a second type that may be delivered out of order. In such embodiments, the control unit re-routes the packets of the first type only when receiving the permission indication, and re-routes the packets of the second type as appropriate independently of the permission indication.

The configurations of network node 24 and switch 32 are example configurations, which are chosen purely for the sake of conceptual clarity. In alternative embodiments, any other suitable configurations can also be used. The different elements of network node 24 and switch 32 may be implemented in hardware, such as using one or more Application-Specific Integrated Circuits (ASICs) or Field-Programmable Gate Arrays (FPGAs). In alternative embodiments, some elements of network node 24 and/or switch 32, e.g., packet handler 72 and/or switch control unit 48, may be implemented in software executing on a suitable processor, or using a combination of hardware and software elements.

In some embodiments, packet handler 72, CPU 52 and/or switch control unit 48 may comprise general-purpose processors, which are programmed in software to carry out the node functions described herein. The software may be downloaded to the processors in electronic form, over a network, for example, or it may, alternatively or additionally, be provided and/or stored on non-transitory tangible media, such as magnetic, optical, or electronic memory.

Adaptive Routing Controlled by the Source Node

Figure 4A:
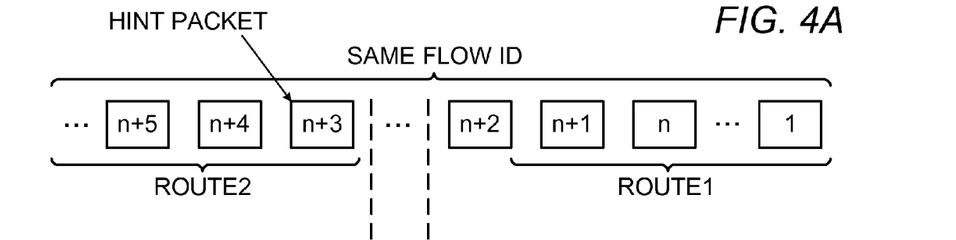
FIGS. 4A and 4B are diagrams depicting packet flows that are re-routed under the control of the source node, in accordance with embodiments that are described herein.
Figure 4B:
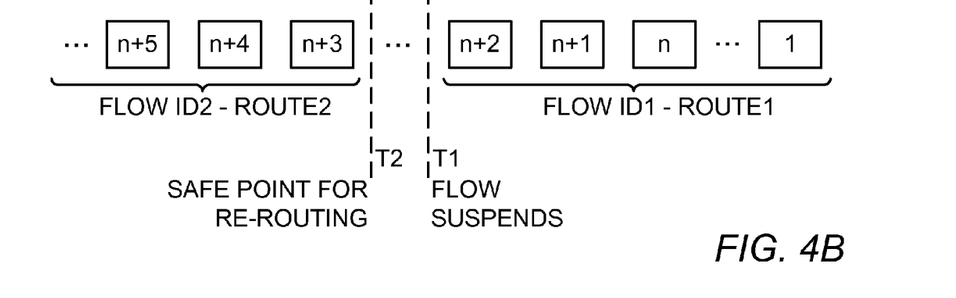

FIGS. 4A and 4B are diagrams depicting packet flows that are re-routed under the control of the source node, in accordance with embodiments that are described herein. The flows depicted in the figures comprise a sequence of packets that are sent from a source node to a destination node over a network. In the present example, the packets can be delivered end-to-end via one of two routing paths denoted ROUTE1 and ROUTE2.

In some of the embodiments disclosed below, to guarantee in-order delivery, the source node allows to change the path only when there are no packets of the flow in flight.

In the example of FIGS. 4A and 4B the network elements are initially configured to deliver the packets via ROUTE1. Assuming static routing, all the packets 1 . . . (n+2) follow the same routing path and therefore packet ordering is guaranteed.

Between time instances T1 and T2 the flow temporarily suspends. For example, the source node may suspend the flow, for example, for creating a time point suitable for re-routing. Alternatively, the flow suspends because the source node temporarily has no data to send. In the present example we assume that all the flow packets sent before suspending the flow arrive successfully at the destination node before T2. Therefore, after T2 the source node can resume the flow via ROUTE2 without causing out-of-order delivery.

In some of the embodiments that will be described below, the source node chooses a time suitable for changing the flow routing path and indicates to the network elements permission for re-routing. In response to the receiving the permission indication, one or more of the network elements assigns the flow a different egress interface so as to change the routing path of the flow.

In FIG. 4A the source node indicates the permission by sending a dedicated packet (n+3) that carries the permission indication. Alternatively, instead of a dedicated packet, the source node may set the permission indication within a header field of one or more packets of the flow.

In some embodiments, the network elements route the packets of a given flow based on a routing value set in headers of the packets, and the permission indication comprises a change to this routing value. In the example of FIG. 4B, the routing values comprise flow identifiers ID1 and ID2 corresponding to the routing paths ROUTE1 and ROUTE2, respectively. In this case the source node indicates the permission for re-routing by changing the value of the flow identifier from ID1 to ID2. In other embodiments, the routing value comprises a hash value calculated over one or more fields in the packet headers, and the permission indication comprises a change to the routing value and therefore to the hash value.

Figure 5:
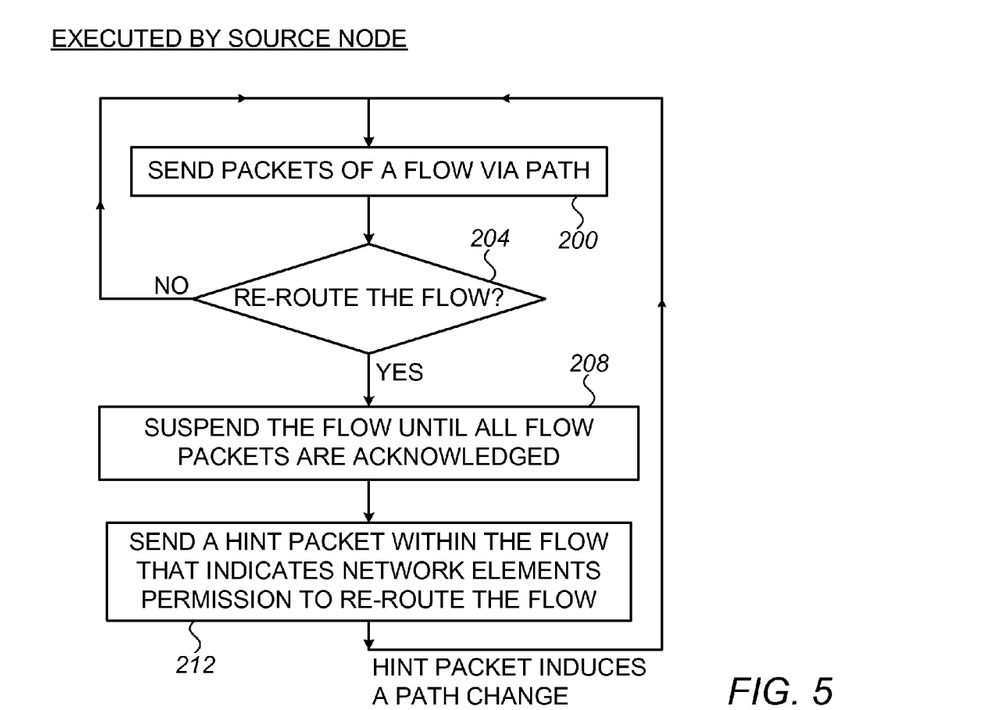
FIG. 5 is a flow chart that schematically illustrates a method for adaptive routing that is controlled by the source node, in accordance with an embodiment that is described herein.

FIG. 5 is a flow chart that schematically illustrates a method for adaptive routing that is controlled by the source node, in accordance with an embodiment that is described herein. The method can be executed, for example, by a network node 24 of FIG. 2 above, serving as a source node, also referred to as flow originator. The method is advantageously executed when the network elements in the network execute the method of FIG. 6 that will be described below.

The method begins at a sending step 200, by the source node sending a flow comprising a sequence of packets to a destination node over a network. The flow packets are delivered end-to-end through a series of network elements that make a routing path for the flow.

In some embodiments, all the flow packets should be delivered in-order to avoid retransmissions, such as in TCP flows. In other embodiments, the flow packets are allowed to arrive to the destination out of order, such as in UDP flows. In yet other embodiments the flow comprises packets of both types. Routing strategies for the different packet types are described below.

At a re-route checking step 204, the source node checks whether or not to allow re-routing the flow. The source node can decide on re-routing at step 204 based on various criteria. In some embodiments, the source node decides to allow re-routing in response to receiving a re-routing request from a network element in the current routing path. For example, the network element may request the source node to allow re-routing the flow when the network element internally detects that the flow is congested.

In other embodiments, the source node determines the congestion status of the flow by analyzing congestion control massages that are inherently built in the communication system, such as, for example, in IB networks. In an embodiment, the source node randomly decides to allow re-routing. Alternatively, the source node decides to allow re-routing periodically at a predefined, configurable or adaptively adjusted interval. For example, adjusting the interval can be based on the congestion level of the flow.

When at step 204 the source node does not allow re-routing, the method loops back to step 200 to continue sending the flow packets via the current routing path. Alternatively, the source node decides to allow re-routing and proceeds to a flow suspension step 208, in which the source node suspends the flow to create a suitable point for re-routing. Alternatively, the source node applies any other suitable transport-level function to create the suitable point in time for re-routing.

In some embodiments, the source node decides on AR by applying certain transport level functions or algorithms. For example, in an embodiment, the source node suspends the flow until all the flow packets that were sent before the suspension are acknowledged by the destination node. Other transport-level operations include, for example, waiting a predefined or configurable time from the suspension time and packet retransmissions. The source node may apply the transport-level functions before or after path re-routing.

In some embodiments, the source node decides on AR by blocking pending transport-level transactions until all outstanding transactions are completed. The flow-suspension and transaction-blocking operations at the source node are transport-level operations, also referred to as fencing operations or applying a fence.

The time point at which the flow has no in-flight packets is considered a safe point for re-routing. In an embodiment, the source node sends to the destination node an acknowledgement request packet that explicitly requests the destination node to acknowledge this packet, and the source node identifies a safe point for re-routing when receiving the respective acknowledgement.

In some embodiments, the source node chooses a suitable point for re-routing based on one or more transport layer parameters of the flow, such as parameters that indicate the congestion status of the flow. The transport layer parameters include, for example, the number of pending RDMA work requests, timeout events and retransmission events. Alternatively or additionally, any other suitable transport layer parameters can also be used. Further alternatively or additionally, the source node applies the transport-level functions in a statistical manner, e.g., by applying the transport-level function at a random time. For example, the source node may enforce a fence, at a random time, and then apply a route change and/or retransmit packets according to some suitable statistical distribution.

In some embodiments, the flow comprises a dynamically connected (DC) transport flow, as described, for example, in U.S. Pat. No. 8,213,315, whose disclosure is incorporated herein by reference. A DC transport service allows the source node to dynamically connect a given flow with different remote nodes during different non-overlapping periods. In an embodiment, at step 208, the source node disconnects a DC connection of a flow to one destination, and identifies a safe point for re-routing before re-connecting the DC flow with another destination. In other embodiments, the source node can force disconnection of the current DC connection before re-routing, for example, by forcing a fence and disconnecting even when there are pending WRs associated with the current destination.

At an indication step 212, the source node sends, within the flow, a dedicated packet carrying a permission indication for re-routing to the network elements. Alternatively, the source node sends the permission indication within one or more packets of the flow and not within dedicated packets that increase the traffic load in the network. Further alternatively, the dedicated packet may be sent via another flow whose path shares at least one network element with the path of the flow to be re-routed.

In some embodiments, the permission indication comprises a binary value of a single bit. Alternatively, the permission indication value comprises two or more bits. In some embodiments, the source node sets the permission indication in available fields of the packet headers. Alternatively, the permission indication comprises extension headers in addition to the headers used by the underlying communication protocols. For example, in an embodiment, the source node encapsulates the original packet by adding a header that carries the permission indication.

In some embodiments, the permission indication comprises a value change rather than an absolute value. For example, in some embodiments, the flow packets carry routing information that the network elements use for routing the flow. Thus, by changing the routing information, the source node signals to the network elements permission for re-routing the flow. The routing information can comprise, for example, flow identifiers such as one or more of: source address, destination address, protocol type, source port and destination port. In an example embodiment, the flow identifier comprises the UDP source port (UDP.Sport) field.

In some embodiments, the network element applies a predefined hash function to one or more header fields of the incoming packets, and uses the result hash value for routing. In these embodiments, the source node indicates the permission for re-routing by changing one or more of the field values to be hashed in the network elements.

Following step 212, the method loops back to step 200 in which the source node resumes sending the flow via a different routing path as selected by the network elements.

As noted above, a given flow may comprise packets that should be delivered in order, packets that are allowed to be delivered out of order or packets of both types. When all the flow packets should be delivered in order the source node may apply the method of FIG. 4 as described above. When all the flow packets are allowed to be delivered out of order, the source node may set the permission indication for re-routing in all of these packets. When the flow contains packets of both types, the source node can selectively permit re-routing the packets of the first type as described in the method of FIG. 5, and allow re-routing the packets of the second type regardless of choosing a suitable point for re-routing as described in the method of FIG. 5.

Congestion Control Based on Adaptive Routing

Figure 6:
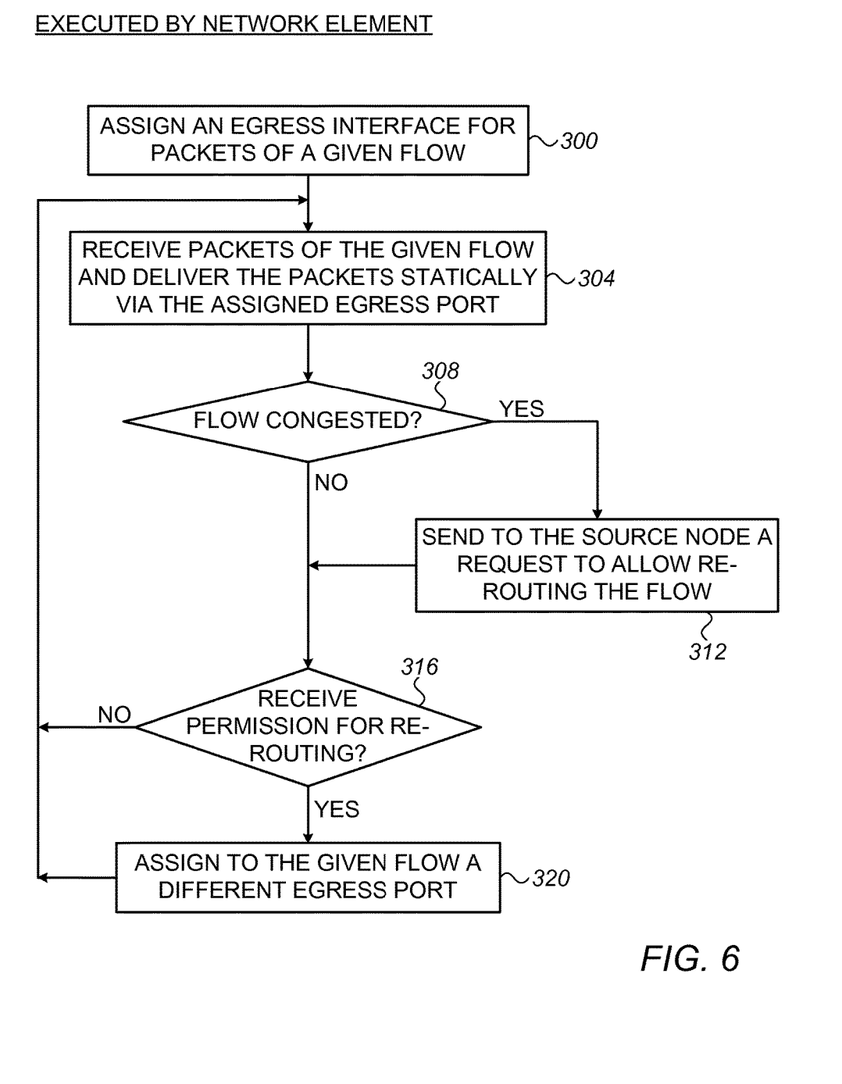
FIG. 6 is a flow chart that schematically illustrates a method for congestion control based on adaptive routing, in accordance with an embodiment that is described herein.

FIG. 6 is a flow chart that schematically illustrates a method for congestion control based on adaptive routing, in accordance with an embodiment that is described herein. The method can be executed, for example, by a network element, such as switch 32 of FIG. 3. The method is advantageously performed when the network nodes serving as source nodes execute the method of FIG. 5.

The method begins at an assignment step 300, by the switch assigning an egress interface for the packets of a given flow that are received via some ingress interface. The switch can use any suitable method for assigning an egress interface for the flow. For example, the switch can assign a default predefined egress interface to each ingress interface. Alternatively, the switch receives the initial assignment from the network operator, over the network, using any suitable protocol. By performing step 300 in multiple switches, an initial routing path is created between the source node of the given flow and the flow destination node.

At a delivery step 304, the switch receives one or more packets of the flow via the ingress interface of the flow and delivers these packets to the egress interface that was assigned at step 300. In some embodiments, the switch routes the flow via the assigned egress interface until receiving a permission indication from the source node to re-route the flow, as will be described below.

At a congestion status checking step 308, the switch checks whether the given flow is congested. In some embodiments, the switch detects that the flow is congested when a queue from which the flow packets are delivered to the network via the assigned egress interface becomes overfilled. Alternatively, the switch may use any other suitable method for detecting that the flow is congested.

When at step 308 the switch detects congestion, the method proceeds to a requesting step 312, in which the switch sends a message to the source node, requesting permission to re-route the flow. The switch can send the request in various ways. In some embodiments, the switch sends the request using a dedicated packet. In other embodiments, the switch sends the request within available fields in headers of the flow packets. For example, to avoid sending dedicated request packets that may increase the traffic load, the switch can send the request messages within the flow packets that are being sent to the destination node, which sends the requests back to the source node, for example, within acknowledgement packets. In some embodiments, the switch signals the request for re-routing, to the source node, using congestion control messages that are built in the communication protocols of the network.

In some embodiments, the switch sends multiple re-routing requests to resolve the congestion situation. The switch may send the multiple requests using any suitable scheme such as, for example, sending the requests periodically until resolving congestion state of the flow. The switch can wait a predefined interval between successive requests, or change the interval adaptively based, for example, on the congestion level.

When at step 308 the flow is found uncongested, or after sending the request at step 312, the method proceeds to a permission reception step 316, in which the switch checks whether the switch has received a permission indication for re-routing. In some embodiments, the indication is sent from the source node in response to receiving the switch request of step 312. In other embodiments, the source node indicates the permission for re-routing independently of the switch, as described, for example in the method of FIG. 5 above.

When at step 316 the switch does not receive permission for re-routing, the method loops back to step 304 to deliver subsequent flow packets via the current path. Otherwise, the switch proceeds to a re-routing step 320, in which the switch possibly assigns to the flow a different egress interface. Following step 320, the switch loops back to step 304, in which the switch delivers the flow packets via the egress interface assigned at step 320. Note that although at step 320 the switch typically re-routes the flow to a different egress interface, the switch may decide to continue routing the flow via the current egress interface.

The switch can use any suitable method, including adaptive routing methods, for selecting an egress interface at step 320. For example, the switch may select the egress interface based on predefined fields in the packet headers. In an example embodiment, the switch may apply a hash function to one or more fields in the packet headers and use the hash result for routing the packet. Note that the switch refrains from changing the routing selection of step 320 until receiving another permission indication at step 316.

As noted above, the flow may contain packets that are allowed to arrive at the destination out of order. In other cases, the flow may comprise packets of a first type that should be delivered in order, as well as packets of a second type that are allowed out-of-order delivery. In such embodiments, the switch can check for the re-routing permission at step 316 for flow packets of the first type, and skip step 316 for flow packets of the second type. Alternatively, the source node can set the permission indication in the packets of the second type, and the switch executes step 316 for these packets as well.

The method described in FIGS. 5 and 6 are given by way of example and in alternative embodiments other suitable methods can also be used. For example, in the method of FIG. 5, instead of suspending the flow at step 208, the source node can identify a time gap in which the source node sends no packets of the flow in question, the gap is sufficiently long for all the packets of the flow that were sent to be acknowledged. As another example, a variant of the method of FIG. 6 can be used, assuming that the source node decides on re-routing, e.g., by analyzing the congestion status of the flow. In such a variant method the switch can skip steps 308 and 312 in the method of FIG. 6.

In the embodiments described above we mainly assume that the network elements are unaware of the transport layer of the flow. In alternative embodiments, some of the source node functionality described herein may be carried out by a network element that is aware of the transport layer, maintains a similar state, and uses the traffic sent and received by the source node to determine its intention.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a network element that comprises multiple interfaces for connecting to a communication network, including an ingress interface and first and second egress interfaces, configuring the first and second egress interfaces as selectable for routing a flow comprising a sequence of packets that originate in a source and are destined to a destination;
   receiving packets of the flow via the ingress interface, and routing the received packets to the destination via the first egress interface;
   monitoring a status of the first egress interface;
   upon detecting that the first egress interface is congested, sending a request to the source to determine a point in time for re-routing the flow by the network element; and
   in response to receiving from the source an indication of the point in time, routing subsequent packets of the flow, to the destination, via the second egress interface.

2. The method according to claim 1, wherein sending the request comprises sending one or more request messages in response to detecting congestion on the first egress interface.

3. The method according to claim 1, wherein routing the subsequent packets of the flow comprises selecting the second egress interface using an adaptive routing method.

4. A method, comprising:
   in a source node that communicates with a destination node via a communication network that comprises network elements, sending a flow comprising a sequence of packets to the destination node through a path comprising one or more of the network elements;
   receiving from a network element, which is located along the path and which supports routing the flow to the destination node via multiple selectable egress ports, a request to determine a time point suitable for re-routing the flow by the network element;
   in response to receiving the request, selecting by the source node a time point suitable for re-routing the flow to the destination node via a different path; and
   after selecting the time point, sending by the source node to one or more of the network elements an indication that the selected time point is suitable for re-routing subsequent packets of the flow.

5. The method according to claim 4, wherein sending the indication comprises sending the indication that permits a single re-routing of the flow.

6. The method according to claim 4, wherein selecting the time point comprises selecting a time in which re-routing the flow is not expected to cause out-of-order delivery of the packets.

7. The method according to claim 4, wherein selecting the time point comprises suspending the flow in the source node until all the packets sent by the source node prior to suspending the flow are acknowledged by the destination node.

8. The method according to claim 4, wherein the packets belong to at least one of a first and second types, wherein packets of the first type should be delivered in order, and packets of the second type are allowed to be delivered out of order, and wherein selecting the time point applies to the packets of the first type and not to the packets of the second type.

9. The method according to claim 4, wherein the flow comprises a dynamically connected (DC) flow, and wherein selecting the time point comprises choosing the time point after disconnecting the flow with the destination node and before re-connecting the flow with another destination node.

10. The method according to claim 4, wherein selecting the time point comprises blocking pending transport level transactions until all outstanding transactions are completed.

11. The method according to claim 4, wherein sending the flow comprises transmitting the flow using a transport layer protocol, and wherein selecting the time point comprises analyzing a status of the transport layer protocol.

12. The method according to claim 4, wherein sending the indication comprises setting a permission value for routing the flow in a field of a packet header.

13. The method according to claim 12, wherein the permission value comprises a routing value that determines per-packet routing within the network elements, and wherein sending the indication comprises changing the routing value in the field of the packet header.

14. The method according to claim 4, wherein sending the indication comprises sending a dedicated packet for permitting the re-routing at the selected time point.

15. The method according to claim 4, wherein selecting the time point comprises choosing the time point randomly.

16. The method according to claim 4, wherein selecting the time point comprises applying to the flow a transport-level function that creates the time point suitable for re-routing the flow.

17. The method according to claim 16, wherein applying the transport-level function comprises applying the function at a random time.

18. The method according to claim 17, wherein applying the function at the random time comprises selecting the random time depending on at least a congestion control state of the flow.

19. A network node, comprising:
   a network interface, which is configured to communicate with a destination node via a communication network that comprises network elements; and
   circuitry, configured to:
      send a flow comprising a sequence of packets to the destination node through a path comprising one or more of the network elements;
      receive from a network element, which is located along the path and which supports routing the flow to the destination node via multiple selectable egress ports, a request to determine a time point suitable for re-routing the flow by the network element;
      in response to receiving the request, select a time point suitable for re-routing the flow to the destination node via a different path; and
      after selecting the time point, send to one or more of the network elements an indication that the selected time point is suitable for re-routing subsequent packets of the flow.

20. The network node according to claim 19, wherein the circuitry is configured to send the indication that permits a single re-routing of the flow.

21. The network node according to claim 19, wherein the circuitry is configured to select the time point by selecting a time in which re-routing the flow is not expected to cause out-of-order delivery of the packets.

22. The network node according to claim 19, wherein the circuitry is configured to suspend the flow until all the packets sent prior to suspending the flow are acknowledged by the destination node.

23. The network node according to claim 19, wherein the packets belong to at least one of a first and second types, wherein packets of the first type should be delivered in order, and packets of the second type are allowed to be delivered out of order, and wherein the circuitry is configured to apply selection of the time point to the packets of the first type and not to the packets of the second type.

24. The network node according to claim 19, wherein the circuitry is configured to choose the time point in response to receiving a request from a network element to determine the time point.

25. The network node according to claim 19, wherein the circuitry is configured to transmit the flow using a transport layer protocol, and to select the time point by analyzing a status of the transport layer protocol.

26. The network node according to claim 19, wherein the circuitry is configured to send the indication by setting a permission value for routing the flow in a field of a packet header.

27. The network node according to claim 26, wherein the permission value comprises a routing value that determines per-packet routing within the network elements, and wherein the circuitry is configured to send the indication by changing the routing value in the field of the packet header.

28. The network node according to claim 19, wherein the circuitry is configured to send the indication by sending a dedicated packet for permitting the re-routing at the selected time point.

29. A network element, comprising:
multiple interfaces, including an ingress interface and first and second egress interfaces, which are configured to connect to a communication network; and
packet processing circuitry, configured to:
configure the first and second egress interfaces as selectable for routing a flow comprising a sequence of packets that originate in a source and are destined to a destination;
receive packets of the flow via the ingress interface and route the received packets to the destination via the first egress interface;
monitor a status of the first egress interface;
upon detecting that the first egress interface is congested, send a request to the source to determine a point in time for re-routing the flow by the network element; and
in response to receiving from the source an indication of the point in time, route subsequent received packets of the flow, to the destination, via the second egress interface.

30. An apparatus for communication, comprising:
a source node, configured to:
communicate with a destination node via a communication network that comprises network elements, by sending a flow comprising a sequence of packets to the destination node through a path comprising one or more of the network elements; and
in response to receiving, from one of the network elements, a request to select a time point suitable for re-routing the flow to a different path, select the time point, and send to one or more of the network elements an indication that the selected time point is suitable for re-routing subsequent packets of the flow; and
a network element of the communication network that comprises multiple interfaces, including an ingress interface and first and second egress interfaces for connecting to the communication network, the network element is configured to:
configure the first and second egress interfaces as selectable for routing the flow to the destination node;
receive packets of the flow via the ingress interface and route the received packets to the destination node via the first egress interface;
monitor a status of the first egress interface;
upon detecting that the first egress interface is congested, send a request to the source node to determine a time point for re-routing the flow by the network element; and
in response to receiving from the source node the indication of the time point that was selected by the source node, route subsequent packets of the flow received in the network element, to the destination node, via the second egress interface.

* * * * *